(12) United States Patent
Kuwahara

(10) Patent No.: US 10,830,292 B2
(45) Date of Patent: Nov. 10, 2020

(54) TORQUE LIMITER

(71) Applicant: AISIN SEIKI KABUSHIKI KAISHA, Kariya (JP)

(72) Inventor: Kuniaki Kuwahara, Aichi-ken (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 305 days.

(21) Appl. No.: 15/923,034

(22) Filed: Mar. 16, 2018

(65) Prior Publication Data
US 2018/0283473 A1  Oct. 4, 2018

(30) Foreign Application Priority Data
Mar. 29, 2017 (JP) ................. 2017-064629

(51) Int. Cl.
*F16D 43/202* (2006.01)
*F16D 7/04* (2006.01)
*F16D 27/118* (2006.01)

(52) U.S. Cl.
CPC .......... *F16D 43/2024* (2013.01); *F16D 7/044* (2013.01); *F16D 27/118* (2013.01)

(58) Field of Classification Search
CPC ..... F16D 43/2024; F16D 27/118; F16D 7/044
USPC ................ 464/464, 38; 192/55.1, 56.61
See application file for complete search history.

(56) References Cited

U.S. PATENT DOCUMENTS

| 1,523,413 | A | * | 1/1925 | Gent ............... F16D 27/118 |
| 5,700,196 | A | * | 12/1997 | Banemann ........... F16D 7/042 |
| 7,404,544 | B2 | * | 7/2008 | McDonald ........... F16D 7/044 |

FOREIGN PATENT DOCUMENTS

| DE | 35 03 749 A1 | 8/1986 | |
| GB | 1 325 679 | * 8/1977 | ............... 464/38 |
| JP | 2014-052048 A | 3/2014 | |

OTHER PUBLICATIONS

Office Action (First Office Action) dated Jun. 4, 2020, by the State Intellectual Property Office of People's Republic of China in corresponding Chinese Patent Application No. 201810258673.5 and an English Translation of the Office Action. (8 pages).

* cited by examiner

Primary Examiner — Greg Binda
(74) Attorney, Agent, or Firm — Buchanan Ingersoll & Rooney PC

(57) ABSTRACT

A torque limiter includes a first meshing portion provided at a surface of an input shaft which transmits a drive force of a drive motor, the surface intersecting with an axial direction of the input shaft, and a disc spring portion including a second meshing portion arranged facing the first meshing portion in the axial direction and which is configured to mesh with the first meshing portion. The disc spring portion is integrally rotatable with an output shaft which is provided coaxially with the input shaft and which is rotatable relative to the input shaft, and is deflected to displace the second meshing portion in a direction opposite to the first meshing portion in a case where a load equal to or greater than a set value is applied to the disc spring portion while the second meshing portion is being biased towards the first meshing portion.

11 Claims, 9 Drawing Sheets

F I G. 7
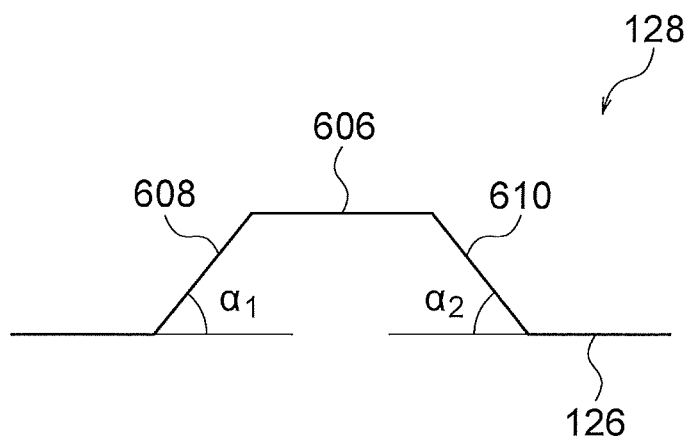

TORQUE LIMITER

CROSS REFERENCE TO RELATED APPLICATIONS

This application is based on and claims priority under 35 U.S.C. § 119 to Japanese Patent Application 2017-064629, filed on Mar. 29, 2017, the entire content of which is incorporated herein by reference.

TECHNICAL FIELD

This disclosure generally relates to a torque limiter.

BACKGROUND DISCUSSION

A known torque limiter which is incorporated in a differential gear is disclosed in JP2014-052048A (hereinafter referred to as Patent reference 1). The torque limiter disclosed in Patent reference 1 includes a first rotational member, a second rotational member, and a pressing mechanism which are arranged in a differential case rotatably provided about an axis of a drive shaft. The first rotational member integrally rotates with the differential case by an output of a transmission. The second rotational member faces and is coaxially arranged with the first rotational member so as to be engageable therewith. The pressing mechanism is disposed adjacent to the first rotational member and generates a pressing force in a circumferential direction of the pressing mechanism by a spring.

The first rotational member includes teeth extending in a radial direction of the first rotational member at a surface facing the second rotational member. The second rotational member includes teeth extending in a radial direction of the second rotational member at a surface facing the first rotational member. The first rotational member and the second rotational member engage with each other via the teeth thereof.

The first rotational member which is provided so as to be slidable in an axial direction of the first rotational member and the pressing mechanism which is provided so as to be slidable in the circumferential direction of the pressing mechanism are arranged such that inclination surfaces thereof engage with each other. Accordingly, the first rotational member is applied with the pressing force in the circumferential direction as a pressing force in the axial direction via the inclination surface, and thereby slides and is pressed towards the second rotational member.

In the aforementioned configuration, in a state where a torque which is equal to or lower than a maximum torque is inputted to the differential gear, the first rotational member and the second rotational member transmit such torque by maintaining the engagement therewith with the pressing force applied by the pressing mechanism. Meanwhile, in a case where the differential gear is inputted with a torque that is equal to or greater than a predetermined value, the first rotational member and the second rotational member disconnect the transmission of the torque by the disengagement of the first rotational member and the second rotational member by sliding of the first rotational member in a direction opposite to the second rotational member against the pressing force applied by the pressing mechanism.

However, because the torque limiter disclosed in Patent reference 1 uses a sliding member as a requisite component to establish an operation disconnecting the transmission of the torque (disconnecting operation), issues described below occur.

First, even though the torque limiter is designed to disconnect the transmission of the torque when the predetermined torque is inputted, in a case where the predetermined torque is actually inputted, the transmission of the torque may not be disconnected because the sliding member applied with a large amount of load slides against a frictional force. Specifically, when the aforementioned predetermined torque is inputted, it is intended that the first rotational member slides in a direction away from the second rotational member against the pressing force applied from the pressing mechanism. However, because the frictional force is generated at a part where the inclination surface of the first rotational member and the inclination surface of the pressing mechanism are in contact with each other, and at a part between the pressing mechanism and a guide wall surrounding the pressing mechanism, for example, the first rotational member may not slide as intended and the transmission of the torque may not be disconnected even though the aforementioned predetermined torque is inputted. Accordingly, in practice, the transmission of the torque may not be disconnected even when the torque which is larger than the aforementioned predetermined torque is inputted. Thus, a torque (a release torque) required by the torque limiter to establish the disconnecting operation may increase depending on the frictional force arising from the sliding member.

Moreover, in a case where a high-frequency impact load is inputted, the sliding member may move (slide) at a timing later than intended because of having a large inertia mass. Accordingly, in practice, the transmission of the torque may not be disconnected even when the torque larger than the predetermined torque is inputted. Thus, the release torque may increase depending on the inertia mass of the sliding member.

As above, when the torque limiter is designed, it is required to include a power transmission system, for example, the torque limiter, having a great torque strength by assuming that the release torque may increase. Thus, the power transmission system is required to be upsized.

A need thus exists for a torque limiter which is not susceptible to the drawback mentioned above.

SUMMARY

According to an aspect of this disclosure, a torque limiter includes a first meshing portion provided at a surface of an input shaft which transmits a drive force of a drive motor, the surface intersecting with an axial direction of the input shaft, and a disc spring portion including a second meshing portion which is arranged facing the first meshing portion in the axial direction and which is configured to mesh with the first meshing portion, the disc spring portion being integrally rotatable with an output shaft which is provided coaxially with the input shaft and which is rotatable relative to the input shaft, the disc spring portion being deflected to displace the second meshing portion in a direction opposite to the first meshing portion in a case where a load equal to or greater than a set value is applied to the disc spring portion while the second meshing portion is being biased towards the first meshing portion.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a diagram schematically illustrating a configuration of each tooth of a disc spring portion of the disc spring unit illustrated in FIG. 6 as viewed from an outer circumferential edge of the disc spring portion towards a center axis;

DETAILED DESCRIPTION

Figure 1:
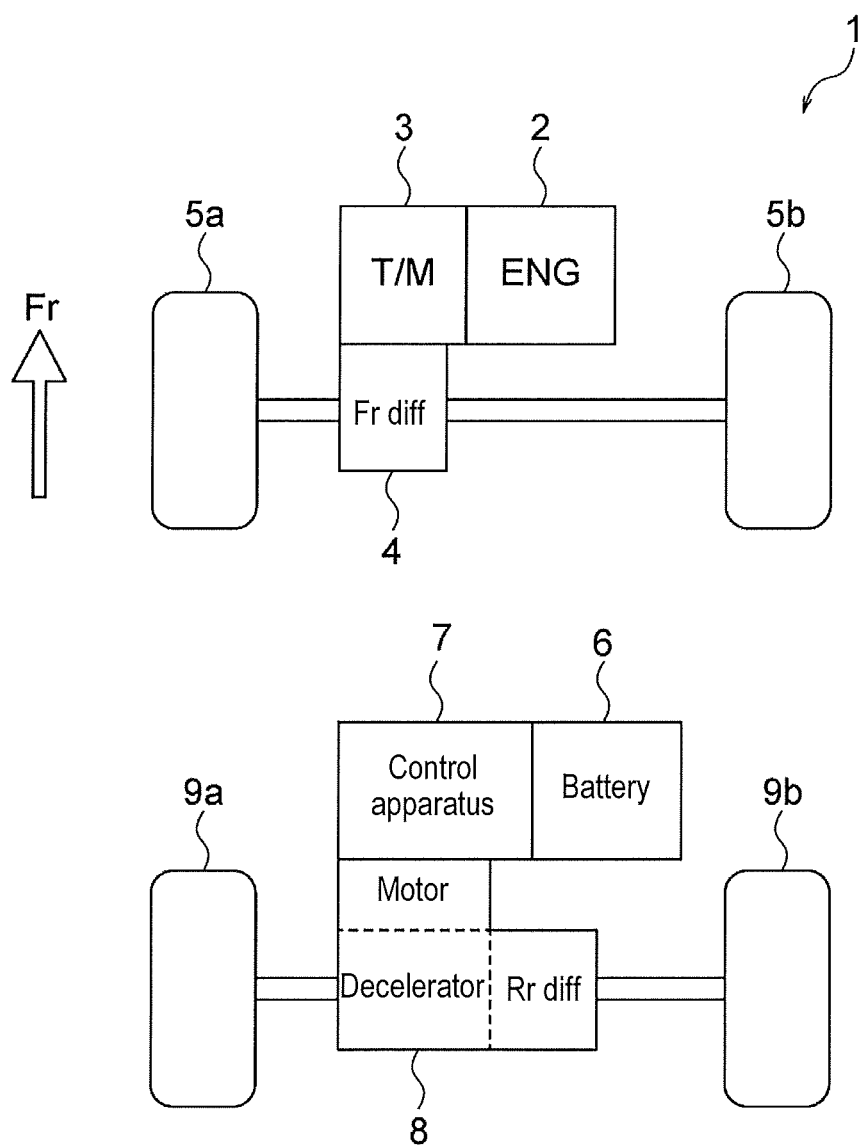
FIG. 1 is a block diagram illustrating a basic construction of a powertrain at which a torque limiter according to an embodiment disclosed here is mounted.

Embodiments in this disclosure are explained with reference to the attached drawings. In the drawings, the same or similar components bear the same reference numerals. In addition, some of the components illustrated in one or more of the drawings may be omitted in the other of the drawings, for example, for the purpose of explanation. Further, a reduction scale may not be accurate in the drawings.

A torque limiter in this disclosure is mounted, for example, at a vehicle which employs a part-time four-wheel-drive system where the vehicle is driven in a front-wheel-drive mode under a usual condition and is driven in a four-wheel-drive mode under an optional condition. The torque limiter in this disclosure is also applicable to a vehicle which employs any drive system including a front-wheel-drive system (i.e., a front-engine, front-wheel-drive layout (FF) vehicle), a rear-wheel-drive system (i.e., a front-engine, rear-wheel-drive layout (FR) vehicle, a mid-engine, rear-wheel-drive layout (MR) vehicle, and a rear-engine, rear-wheel-drive layout (RR) vehicle), and a full-time/part-time four-wheel-drive system, for example.

A construction of a powertrain where the torque limiter is mounted is explained with reference to FIG. 1.

As illustrated in FIG. 1, a vehicle 1 mainly includes, as a front-wheel powertrain, an engine (ENG) 2 generating a drive force, a transmission (T/M) 3 transmitting the drive force of the engine 2, and a front-wheel differential gear (Fr differential) 4 configured to transmit the drive force that is transmitted from the transmission 3 to a left-front wheel 5a and a right-front wheel 5b. The front-wheel differential gear 4 operates to equalize a rotation speed (the number of rotations) of the left-front wheel 5a and a rotation speed (the number of rotations) of the right-front wheel 5b in a case where the vehicle 1 is driven forward and to adjust the rotation speed of the left-front wheel 5a and the rotation speed of the right-front wheel 5b to appropriate numbers respectively in a case where the vehicle 1 turns right or left.

In addition, the vehicle 1 mainly includes, as a rear-wheel powertrain, a battery 6 supplying an electric power, a control apparatus 7 controlling a motor unit 8 with the electric power supplied from the battery 6, and the motor unit 8 controlled by the control apparatus 7 to rotate a left-rear wheel 9a and a right-rear wheel 9b. The motor unit 8 includes a motor (drive motor) generating a drive force, a decelerator transmitting the drive force of the motor and a rear-wheel differential gear (Rr differential) configured to transmit the drive force that is transmitted from the decelerator to the left-rear wheel 9a and the right-rear wheel 9b. The rear-wheel differential gear operates to equalize a rotation speed (the number of rotations) of the left-rear wheel 9a and a rotation speed (the number of rotations) of the right-rear wheel 9b in a case where the vehicle 1 is driven forward and to adjust the rotation speed of the left-rear wheel 9a and the rotation speed of the right-rear wheel 9b to appropriate numbers respectively in a case where the vehicle turns right or left.

The vehicle 1 including the aforementioned powertrain is operated in the front-wheel-drive mode under the usual condition so that the drive force is transmitted to the left-front wheel 5a and the right-front wheel 5b simply by the front-wheel powertrain. In addition, the vehicle 1 is operated in the four-wheel-drive mode under the optional condition, i.e., when the vehicle is driven on a snowy road, for example, so that the drive force is transmitted not only to the left-front wheel 5a and the right-front wheel 5b but also to the left-rear wheel 9a and the right-rear wheel 9b by an operation of a driver of the vehicle or the control of the control apparatus 7.

The motor unit 8 incorporates therein the torque limiter according to one embodiment as explained below.

Figure 2:
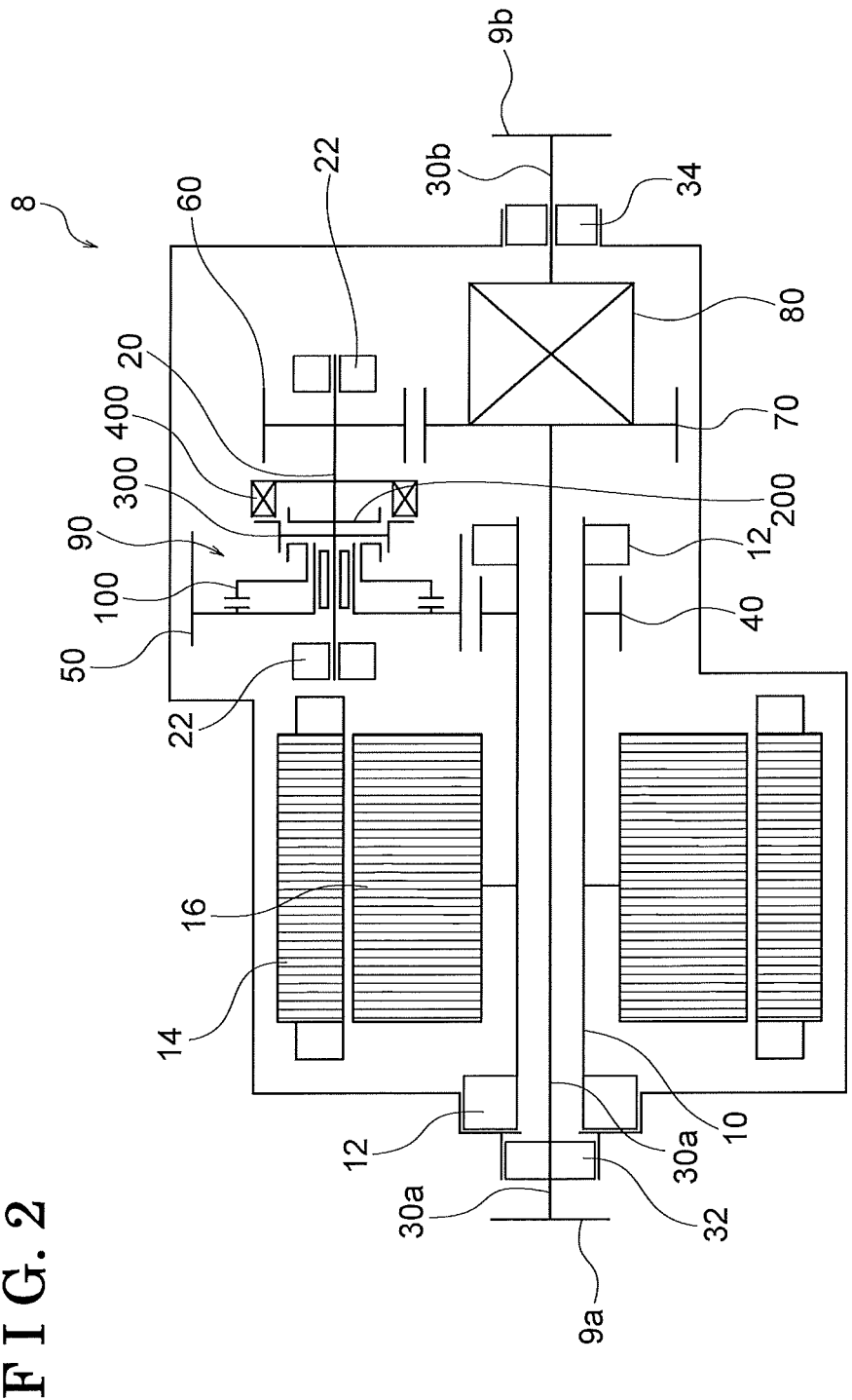
FIG. 2 is a schematic view illustrating a construction of a motor unit illustrated in FIG. 1, the motor unit incorporating therein the torque limiter according to the embodiment.

A basic construction of the motor unit 8 where the torque limiter is mounted is explained with reference to FIG. 2.

The motor unit 8 includes, as main shafts, a motor drive shaft 10 in a hollow form, a counter shaft 20, a left-rear wheel drive shaft 30a and a right-rear wheel drive shaft 30b. The motor drive shaft 10 is rotatably supported by a bearing 12. A rotor 16 provided facing a stator 14 is mounted at an outer circumference of the motor drive shaft 10. The counter shaft 20 is arranged in parallel to the motor drive shaft 10 and is rotatably supported by a bearing 22. The left-rear wheel drive shaft 30a penetrates through the motor drive shaft 10 to be positioned within the motor drive shaft 10 and to be arranged coaxially with the motor drive shaft 10. The left-rear wheel drive shaft 30a to which the left-rear wheel 9a is fixed is rotatably supported by a bearing 32. The right-rear wheel drive shaft 30b is arranged coaxially with the left-rear wheel drive shaft 30a. The right-rear wheel drive shaft 30b to which the right-rear wheel 9b is fixed is rotatably supported by a bearing 34. It may be considered that the stator 14, the rotor 16 and the motor drive shaft 10, for example, mainly constitute the motor.

The motor unit 8 includes, as main gears, a counter drive gear 40, a counter driven gear 50, a final drive gear 60, a final driven gear 70, and a rear-wheel differential gear (Rr differential) 80. The counter drive gear 40 is arranged at the motor drive shaft 10 to integrally rotate therewith. The counter driven gear 50 is arranged at the counter shaft 20 and is rotatable relative to the counter shaft 20 in a state engaging with the counter drive gear 40. The final drive gear 60 is arranged at the counter shaft 20 to integrally rotate therewith. The final driven gear 70 is arranged at the left-rear wheel drive shaft 30a in a state engaging with the final drive gear 60. The rear-wheel differential gear 80 is arranged between the left-rear wheel drive shaft 30a and the right-rear wheel drive shaft 30b. It may be considered that the counter driven gear 50, the counter shaft 20, the final drive gear 60 and the final driven gear 70, for example, mainly constitute the decelerator.

The motor unit 8 further includes a torque limiter 90 engageable with both the counter driven gear 50 and the counter shaft 20 to control torque transmission therebetween.

The torque limiter 90 includes a first face cam 52 (see FIG. 4) provided at the counter driven gear 50 and a disc spring unit 100 which is integrally rotatable with the counter shaft 20 and which includes a second face cam 110 (see FIG. 4) configured to mesh or engage with the first face cam 52. The disc spring unit 100 is configured to be deflected or bend so that the second face cam 110 is displaced in a direction opposite to the first face cam 52, i.e., in a direction away from the first face cam 52, in a case where a load equal to or greater than a set value (i.e., a predetermined torque) is applied to the disc spring unit 100 while the second face cam 110 is being biased to the first face cam 52. Accordingly, the torque limiter 90 may fulfill a function for controlling (specifically, allowing and interrupting) the torque transmission between the counter driven gear 50 and the counter shaft 20. The aforementioned function of the torque limiter 90 is hereinafter referred to as a "torque connection/disconnection function" for the purpose of explanation.

Specifically, the torque connection/disconnection function is a function for allowing transmission of torque in a case where such torque input to the torque limiter 90 is smaller than a release torque and for prohibiting transmission of torque in a case where such torque input to the torque limiter 90 is equal to or greater than the release torque.

The torque limiter 90 may additionally include a hub 200 provided at an outer circumference of the counter shaft 20, a sleeve 300 configured to slide in an axial direction of the counter shaft 20 in a state of engaging with the hub 200 between a first position P1 at which the sleeve 300 is spline-connected to the disc spring unit 100 and a second position P2 at which the sleeve 300 is disconnected from (i.e., away from) the disc spring unit 100, and a solenoid 400 controlling the sliding of the sleeve 300. The sleeve 300 serves as a sliding member. Accordingly, the torque limiter 90 may additionally include a function for controlling (specifically, allowing and interrupting) transmission of the drive force between the counter driven gear 50 and the counter shaft 20. The aforementioned function of the torque limiter 90 is hereinafter referred to as a "drive force connection/disconnection function" for the purpose of explanation.

Specifically, the drive force connection/disconnection function is a function for allowing the transmission of the drive force from the counter driven gear 50 to the counter shaft 20 in a case where the vehicle 1 is driven in the four-wheel-drive mode and for prohibiting the transmission of the drive force between the counter driven gear 50 and the counter shaft 20 in a case where the vehicle 1 is driven in the front-wheel-drive mode so as to restrain drag torque generated within the motor unit 8, for example.

The motor unit 8 including the aforementioned construction is operated as below. In a case where the vehicle 1 is driven in the four-wheel-drive mode, the drive force of the motor (the motor drive shaft 10) is transmitted to the counter shaft 20 via the counter drive gear 40 and the counter driven gear 50. The drive force transmitted to the counter shaft 20 is further transmitted to the final driven gear 70 via the final drive gear 60. The drive force transmitted to the final driven gear 70 is transmitted to the left-rear wheel drive shaft 30a and the right-rear wheel drive shaft 30b via the rear-wheel differential gear 80. The rear-wheel differential gear 80 transmits the drive force to the left-rear wheel drive shaft 30a and the right-rear wheel drive shaft 30b so that the left-rear wheel drive shaft 30a and the right-rear wheel drive shaft 30b rotate at the same rotation speed (same number of rotations) in a case where the vehicle 1 is driven forward. The rear-wheel differential gear 80 also transmits the drive force to the left-rear wheel drive shaft 30a and the right-rear wheel drive shaft 30b so that the left-rear wheel drive shaft 30a and the right-rear wheel drive shaft 30b rotate at respective rotation speeds (respective number of rotations) appropriately in a case where the vehicle 1 turns right or left.

In a case where the torque smaller than the release torque is input to the torque limiter 90, the torque limiter 90 operates to allow the torque transmission between the counter driven gear 50 and the counter shaft 20. Specifically, the second face cam 110 of the disc spring unit 100 is biased towards the first face cam 52 provided at the counter driven gear 50 so as to be meshed with the first face cam 52. As a result, the torque limiter 90 allows the torque transmission between the counter driven gear 50 and the counter shaft 20.

On the other hand, in a case where the torque equal to or greater than the release torque is input to the torque limiter 90, the torque limiter 90 operates to interrupt or block the torque transmission between the counter driven gear 50 and the counter shaft 20. Specifically, the disc spring unit 100 is configured to be deflected or bend so that the second face cam 110 is displaced in the direction away from the first face cam 52. The torque limiter 90 thus interrupts the torque transmission between the counter driven gear 50 and the counter shaft 20 by releasing meshing between the first face cam 52 and the second face cam 110.

In a case where the vehicle 1 is driven in the front-rear drive mode, the torque limiter 90 operates to interrupt the transmission of the drive force between the counter driven gear 50 and the counter shaft 20 so as to restrain generation of the drag torque within the motor unit 8. Specifically, the sleeve 300 which is controlled by the solenoid 400 slides from the first position P1 at which the sleeve 300 is spline-connected to the disc spring unit 100 during the four-wheel driving of the vehicle 1 to the second position P2 at which the sleeve 300 is away from the disc spring unit 100 in a state of engaging with the hub 200 to thereby release the engagement between the disc spring unit 100 and the counter shaft 20. Accordingly, the torque limiter 90 may interrupt the transmission of the drive force between the counter driven gear 50 and the counter shaft 20. Alternatively, even in a case where the vehicle 1 is driven in the front-wheel-drive mode, the torque limiter 90 may operate to allow the transmission of the drive force between the counter driven gear 50 and the counter shaft 20 as necessary. In this case, the sleeve 300 which is controlled by the solenoid 400 slides to the first position P1 at which the sleeve 300 is spline-connected to the disc spring unit 100 in a state of engaging with the hub 200. The disc spring unit 100 and the counter shaft 20 engage with each other so that the torque limiter 90 may allow the transmission of the drive force between the counter driven gear 50 and the counter shaft 20.

Next, examples of specific constructions of the aforementioned torque limiter 90 and components related thereto are explained with reference to FIGS. 3 and 4.

The torque limiter 90 includes the first face cam 52 provided at the counter driven gear 50 which transmits the drive force of the motor and the disc spring unit 100 integrally rotatable with the counter shaft 20 and including the second face cam 110, the second face cam 110 facing the first face cam 52 and being configured to mesh with the first face cam 52. The second face cam 110 is configured to be biased towards the first face cam 52. The first face cam 52 serves as a first meshing portion and the second face cam 110 serves as a second meshing portion.

Further, the torque limiter 90 may additionally include the hub 200, the sleeve 300 and the solenoid 400 as mentioned above.

An example of a specific construction of the counter driven gear 50 is explained with reference to FIG. 5 in addition to FIGS. 3 and 4.

Figure 5:
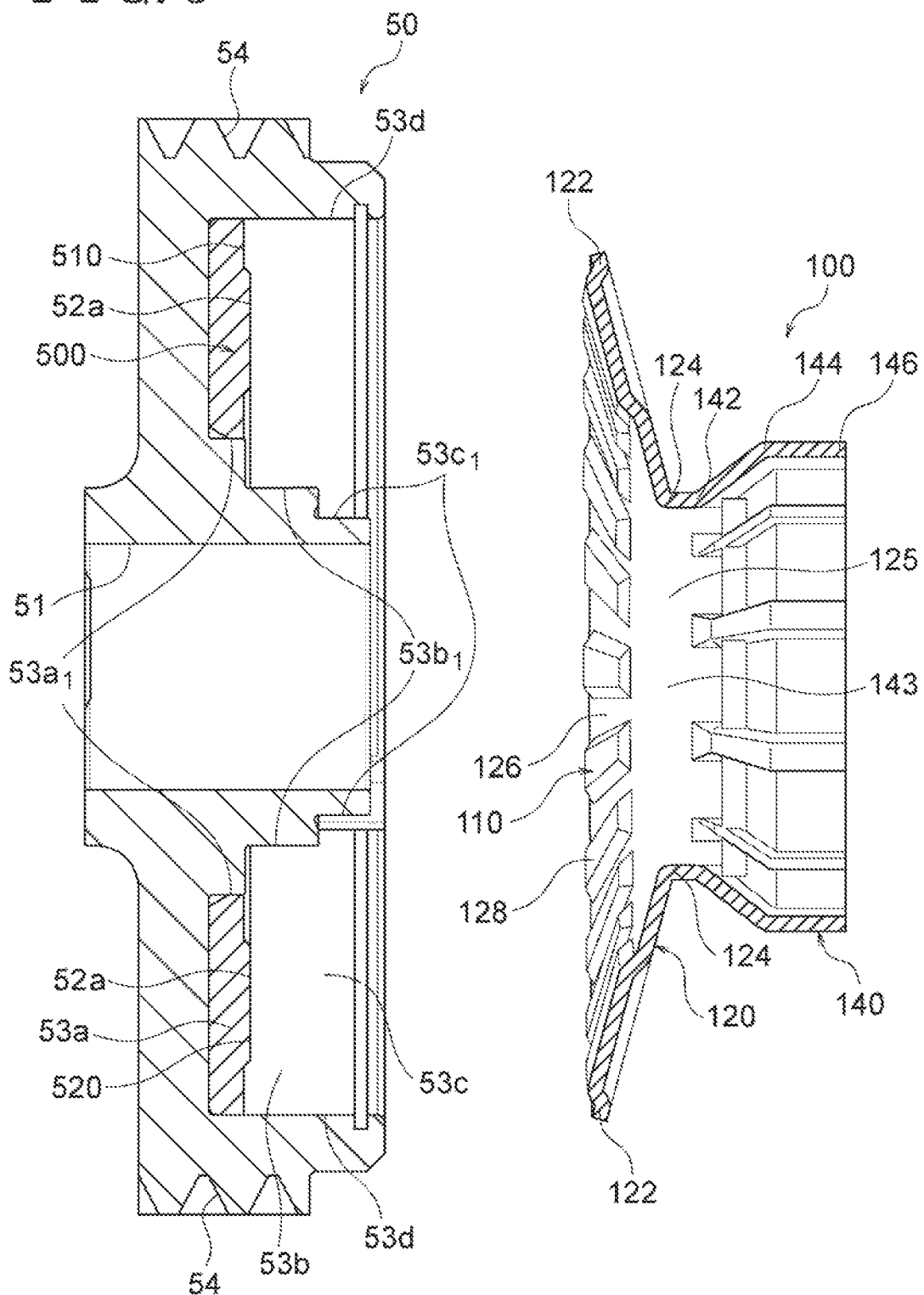
FIG. 5 is a cross-sectional view schematically illustrating constructions of a counter driven gear illustrated in FIGS. 3 and 4 and a disc spring unit fixed to the counter driven gear.

As illustrated in FIG. 5, the counter driven gear 50 is an annular-formed member as a whole while including a penetration bore 51 along a center axis of the counter driven gear 50. The counter driven gear 50 is made of metal such as iron, steel, aluminum alloy and titanium alloy, for example. The counter driven gear 50 includes teeth 54 at an outer peripheral surface, the teeth 54 engaging with teeth provided at the counter drive gear 40.

A housing void which annularly extends as a whole is provided at an inner portion of the counter driven gear 50. The housing void may include, for example, a first void 53a which extends annularly, a second void 53b connected to the first void 53a and extending annularly, and a third void 53c connected to the second void 53b and extending annularly. The first void 53a is surrounded by a first outer peripheral wall 53d including a first diameter and annularly extending and by a first inner peripheral wall 53a1 including a second diameter which is smaller than the first diameter and annularly extending. The second void 53b is surrounded by the first outer peripheral wall 53d and by a second inner peripheral wall 53b1 including a third diameter which is smaller than the second diameter and annularly extending. The third void 53c is surrounded by the first outer peripheral wall 53d and by a third inner peripheral wall 53c1 including a fourth diameter which is smaller than the third diameter and annularly extending.

A plate 500 which annularly extends so as to fill the first void 53a is housed and fixed in the first void 53a. The plate 500 is made of metal such as iron, steel, aluminum alloy and titanium alloy, for example. The first face cam 52a is provided at a surface 510 of the plate 500 facing the disc spring unit 100. The surface 510 serves as a surface of the counter driven gear 50, the surface intersecting with an axial direction of the counter driven gear 50. The first face cam 52a includes plural teeth 520 serving as first protruding portions which are arranged so as to be spaced away from one another and which extend radially.

Figure 3:
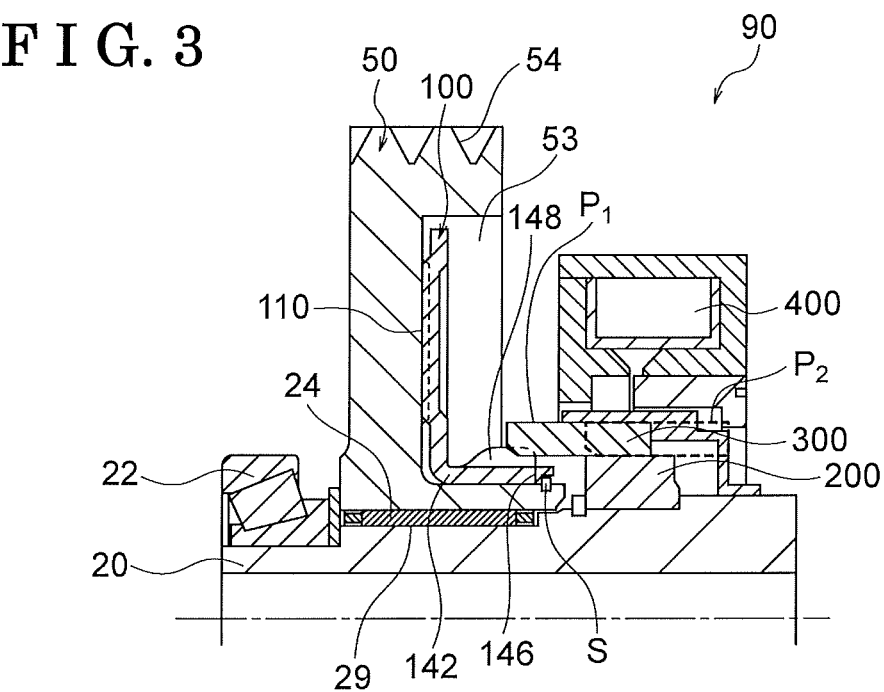
FIG. 3 is a cross-sectional view schematically illustrating partially enlarged constructions of the torque limiter illustrated in FIG. 2 where a torque transmission is allowed and of related components to the torque limiter.
Figure 4:
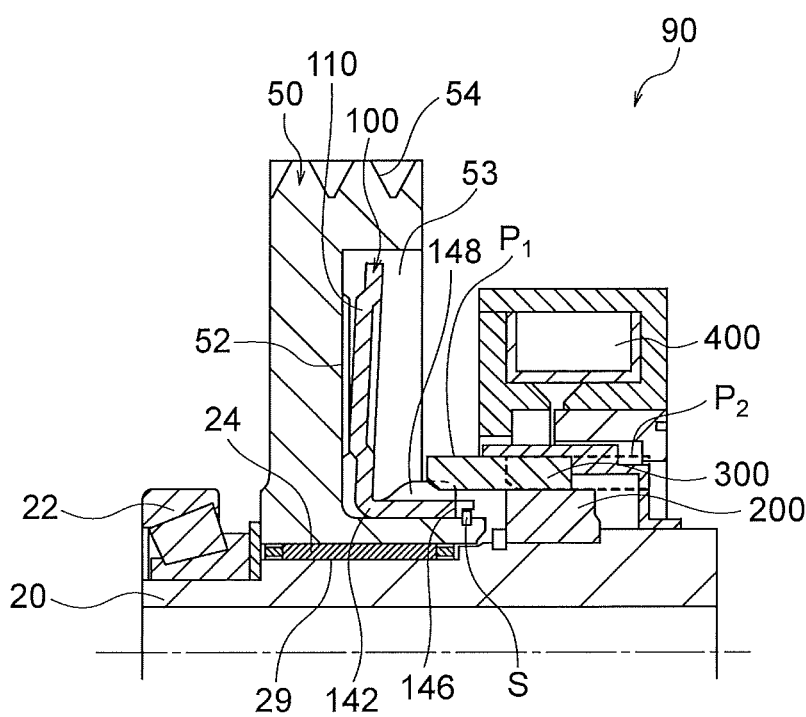
FIG. 4 is a cross-sectional view schematically illustrating the partially enlarged constructions of the torque limiter illustrated in FIG. 2 where the torque transmission is interrupted and of the related components to the torque limiter.

The counter driven gear 50 illustrated in FIG. 5 is rotatable relative to the counter shaft 20 or rotatable integrally with the counter shaft 20 in a state where the counter shaft 20 penetrates through the penetration bore 51 to be positioned therewithin as illustrated in FIGS. 3 and 4.

In order to enhance a relative rotation between the counter driven gear 50 and the counter shaft 20, a clearance 29 is formed in a region of the counter shaft 20 as illustrated in FIGS. 3 and 4, the region extending in a circumferential direction and facing the penetration bore 51 of the counter driven gear 50. In the clearance 29, plural bearings (needle bearings) 24 may be arranged so as to be spaced away from one another. Each of the plural bearings is provided to be rotatable about a center axis which extends in parallel to a center axis of the counter shaft 20.

In comparison between FIG. 5 and FIG. 3 (or FIG. 4), the housing void includes the first void 53a, the second void 53b and the third void 53c in FIG. 5 while the housing void serves as a single void 53 extending annularly in FIG. 3 (or FIG. 4). In this disclosure, the housing void illustrated in FIG. 5 and the housing void illustrated in FIG. 3 (or FIG. 4) are both applicable.

In FIG. 5, the first face cam 52a is formed and provided at the plate 500 (specifically, at the surface 510 of the plate 500 facing the disc spring unit 100). On the other hand, in FIG. 3 (or FIG. 4), the first face cam 52 is directly formed and provided at a surface of the counter driven gear 50, the surface surrounding the single void 53 and facing the disc spring unit 100. In this disclosure, the first face cam 52a illustrated in FIG. 5 and the first face cam 52 illustrated in FIG. 3 (or FIG. 4) are both applicable.

Figure 6:
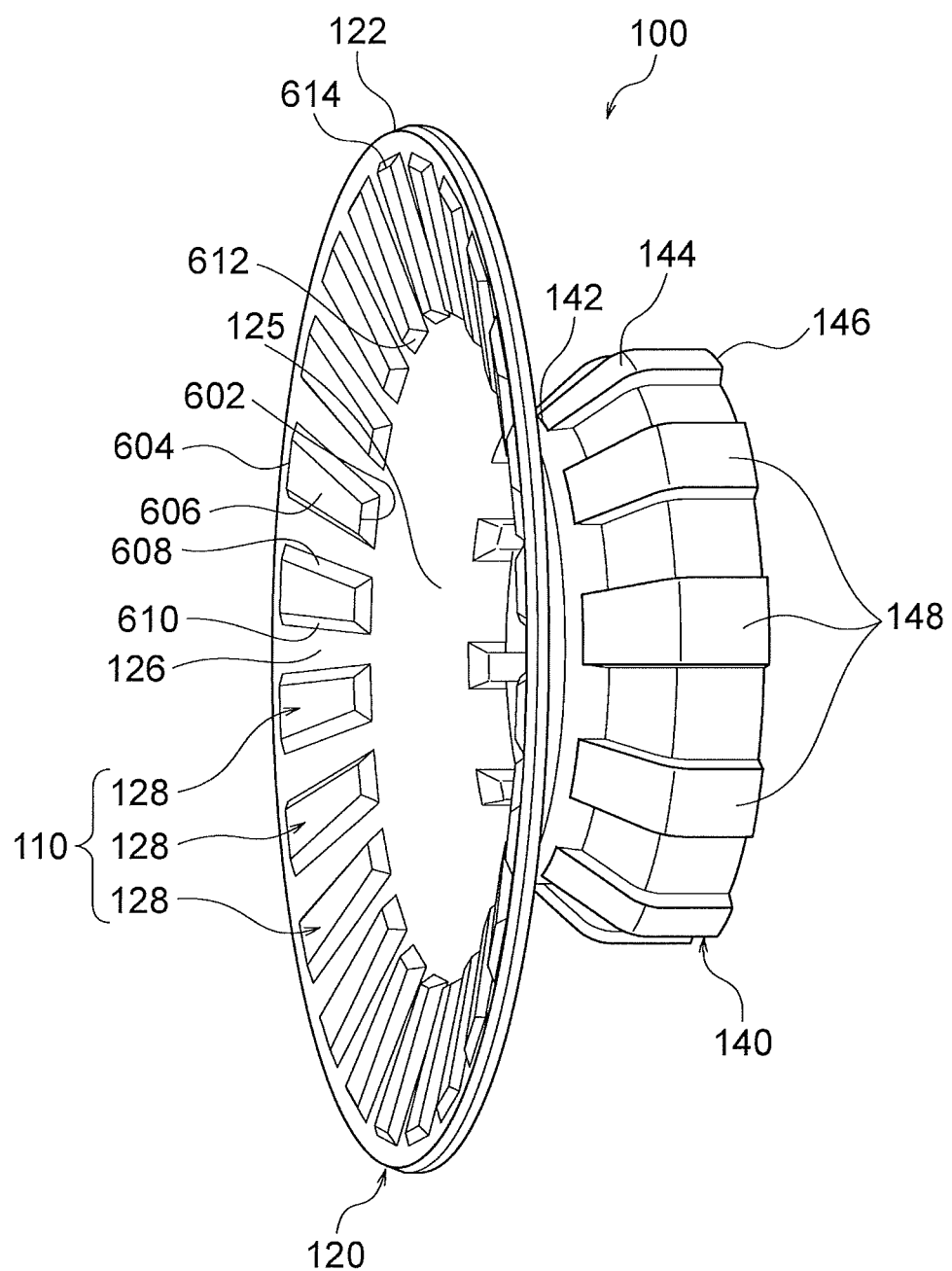
FIG. 6 is a perspective view schematically illustrating the construction of the disc spring unit illustrated in FIGS. 3 to 5.

An example of a specific construction of the disc spring unit 100 is explained with reference to FIG. 6 in addition to FIGS. 3 to 5. In FIGS. 5 and 6, an external force is not applied to the disc spring unit 100.

As illustrated in FIGS. 5 and 6, the disc spring unit 100 is made of metal with flexibility such as iron, steel, aluminum alloy and titanium alloy, for example. The disc spring unit 100 mainly includes a disc spring portion 120 in an annular form and a support portion 140 in a tubular form integrally and coaxially formed and provided with the disc spring portion 120.

In a case where the external force is not applied to the disc spring portion 120, the disc spring portion 120 extends as including a radius which decreases from a first end 122 to a second end 124 of the disc spring portion 120 as illustrated in FIG. 5. The disc spring portion 120 includes a penetration bore 125 at the second end 124. The second face cam 110 is provided at a surface 126 (a reference surface) of the disc spring portion 120 facing the counter driven gear 50. The second face cam 110 includes plural teeth 128 (second protruding portions) provided so as to be spaced away from one another and extending radially. An appropriate interval is provided or defined between one of the teeth 128 and the other one of the teeth 128 adjacent to each other so that the corresponding tooth 520 of the first face cam 52 is arranged between the aforementioned adjacent teeth 128. That is, an appropriate interval is provided or defined between one of the teeth 520 and the other one of the teeth 520 of the first face cam 52 adjacent to each other so that the corresponding tooth 128 of the second face cam 110 is arranged between the aforementioned adjacent teeth 520.

The support portion 140 extends as including a radius which increases from a first end 142 to an intermediate portion 144 of the support portion 140 and extends as including substantially the same radius from the intermediate portion 144 to a second end 146 of the support portion 140. That is, the support portion 140 includes the radius which increases from the first end 142 to the intermediate portion 144, the radius being substantially constant from the intermediate portion 144 to the second end 146. The support portion 140 includes a penetration bore 143 at the first end 142. The support portion 140 is connected integrally, at the first end 142, to the second end 124 of the disc spring portion 120. Accordingly, the penetration bore 143 of the support portion 140 is connected to the penetration bore 125 of the disc spring portion 120.

The support portion 140 includes plural raised portions 148 at an outer peripheral surface, the raised portions 418 being arranged so as to be spaced away from one another and extending in the axial direction.

The disc spring unit 100 illustrated in FIGS. 5 and 6 is mounted to the counter driven gear 50 in a state where the support portion 140 (i.e., the second end 146 thereof, for example) is fixed to the second inner peripheral wall 53b1. Specifically, the second inner peripheral wall 53b1 and the third inner peripheral wall 53c1 of the counter driven gear 50 are inserted to the penetration bore 125 of the disc spring portion 120 and the penetration bore 143 of the support portion 140. The disc spring portion 120 is pressed against the plate 500 until the surface 126 of the disc spring portion 120 becomes substantially vertical to the center axis of the counter driven gear 50 so that the disc spring portion 120 is arranged within the second void 53b. That is, the second end 124 of the disc spring portion 120 and the first end 142 of the support portion 140 make contact with the second inner peripheral wall 53b1.

As illustrated in FIGS. 3 and 4, the disc spring unit 100 may be fixed to the counter driven gear 50 by a snap ring S arranged between a cutout which is provided at the second end 146 of the support portion by extending annularly in the circumferential direction and a groove which is provided at the counter driven gear 50 by extending annularly in the circumferential direction so as to face the cutout. As a result, the support portion is restricted from moving in a direction away from the first face cam 52 along the axial direction (i.e., in a right direction in FIGS. 3 and 4).

The disc spring unit 100 is fixed to the counter driven gear 50 in the aforementioned manner. In the state where the disc spring unit 100 is fixed to the counter driven gear 50, the second face cam 110 provided at the disc spring unit 100 faces the first face cam 52 provided at the counter driven gear 50 as illustrated in FIGS. 3 and 4.

In comparison between FIG. 5 and FIG. 3 (or FIG. 4), the support portion 140 of the disc spring unit 100 extends as including the radius which increases from the first end 142 towards the intermediate portion 144 and extends as including substantially the same radius from the intermediate portion 144 towards the second end 146 in FIG. 5. On the other hand, the support portion extends as including substantially the same (i.e., constant) radius from the first end 142 to the second end 146 in FIG. 3 (or FIG. 4). In this disclosure, the support portion 140 illustrated in FIG. 5 and the support portion illustrated in FIG. 3 (or FIG. 4) are both applicable.

The second face cam 110 provided at the disc spring portion 120 is explained below. As illustrated in FIG. 6, the plural teeth 128 (protruding portions) constituting the second face cam 110 are provided at the annularly-formed surface 126 of the disc spring portion 120. Each of the teeth 128 includes a main surface 606, a first inclination surface 608, a second inclination surface 610, a third inclination surface 612 and a fourth inclination surface 614. The main surface 606 extends in a radial direction from a first end 602 to a second end 604 in parallel to the surface 126 towards an outer circumferential edge of the surface 126. The first inclination surface 608 extends in the radial direction by connecting between the main surface 606 and the surface 126. The second inclination surface 610 extends in the radial direction by connecting between the main surface 606 and the surface 126 while sandwiching the main surface 606 with the first inclination surface 608. The third inclination surface 612 extends in the radial direction towards the center axis of the disc spring portion 120 from the first end 602 of the main surface 606 and inclines towards the surface 126. The fourth inclination surface 614 extends in the radial direction towards the outer peripheral edge of the disc spring portion 120 from the second end 604 of the main surface 606 and inclines towards the surface 126. In the present embodiment, the main surface 606 includes a width increasing from the first end 602 to the second end 604. Alternatively, the main surface 606 may include a width decreasing from the first end 602 to the second end 604 or substantially the same width from the first end 602 to the second end 604, for example.

FIG. 7 schematically illustrates the configuration of each of the teeth 128 as viewed from the outer circumferential edge of the disc spring portion 120 illustrated in FIG. 6 towards the center axis. An angle $\alpha 1$ formed by the first inclination surface 608 relative to the surface 126 is selectable in a range from zero degrees (exclusive) to 45 degrees (inclusive) (i.e., $0 < \alpha 1 \leq 45$). An angle $\alpha 2$ formed by the second inclination surface 610 relative to the surface 126 is also selectable in a range from zero degrees (exclusive) to 45 degrees (inclusive) (i.e., $0 < \alpha 2 \leq 45$). In addition, an angle $\alpha 3$ (not illustrated in FIG. 7) formed by the third inclination surface 612 relative to the surface 126 is also selectable in a range from zero degrees (exclusive) to 45 degrees (inclusive) (i.e., $0 < \alpha 3 \leq 45$). In the same manner, an angle $\alpha 4$ (not illustrated in FIG. 7) formed by the fourth inclination surface 614 relative to the surface 126 is selectable in a range from zero degrees (exclusive) to 45 degrees (inclusive) (i.e., $0 < \alpha 4 \leq 45$). In the embodiment, each of the angles $\alpha 1$ to $\alpha 4$ is specified to 45 degrees. Alternatively, the angles $\alpha 1$ to $\alpha 4$ are not necessarily the same as one another and may be differently specified from one another.

In a state where the first face cam 52 and the second face cam 110 engage with each other (i.e., a state illustrated in FIG. 3), one of the teeth 520 of the first face cam 52 is arranged at a region between the two adjacent teeth 128 of the second face cam 110. That is, one of the teeth 128 of the second face cam 110 is arranged at a region between the two adjacent teeth 520 of the first face cam 52. Thus, each of the teeth 520 of the first face cam 52 desirably includes a configuration so that each of the teeth 520 is appropriately arranged at the region between the two adjacent teeth 128 of the second face cam 110 and that each of the teeth 520 appropriately engages with the two adjacent teeth 128. In the embodiment, each of the teeth 520 of the first face cam 52 may include the same configuration as each of the teeth 128 of the second face cam 110. Specifically, each of the teeth 520 may include a main surface, a first inclination surface, a second inclination surface, a third inclination surface and a fourth inclination surface. The main surface extends in a radial direction from a first end to a second end in parallel to the surface 510 (see FIG. 5) towards an outer circumferential edge of the surface 510. The first inclination surface extends in the radial direction by connecting between the main surface and the surface 510. The second inclination surface extends in the radial direction by connecting between the main surface and the surface 510 while sandwiching the main surface with the first inclination surface. The third inclination surface extends in the radial direction towards the center axis of the counter driven gear 50 from the first end of the main surface and inclines towards the surface 510. The fourth inclination surface extends in the radial direction towards the outer peripheral edge of the counter driven gear 50 from the second end of the main surface. In a state where the first face cam 52 and the second face cam 110 engage with each other, the first inclination surface of the tooth 520 faces or makes contact with the first inclination surface 608 of the tooth 128 and the second inclination surface of the tooth 520 faces or makes contact with the second inclination surface 610 of the tooth 128. Thus, an angle formed by the first inclination surface of the tooth 520 relative to the surface 510 and an angle formed by the second inclination surface of the tooth 520 relative to the surface 510 are desirably equal to the angle α1 formed by the first inclination surface 608 and the angle α2 formed by the second inclination surface 610 of the tooth 128 respectively.

An example of a specific construction of the torque limiter 90 for exercising the drive force connection/disconnection function is explained below. As illustrated in FIGS. 3 and 4, the hub 200 is provided at an outer peripheral surface of the counter shaft 20. The hub 200 includes plural splines serving as a dog clutch and provided so as to be spaced away from one another in the circumferential direction along the outer peripheral surface of the counter shaft 20. In FIGS. 3 and 4, one of the splines in the plural splines of the hub 200 is illustrated. The hub 200 may be made of metal such as iron, steel, aluminum alloy and titanium alloy, for example.

The sleeve 300 is provided to be slidable in the axial direction of the counter shaft 20 in a state of engaging with the hub 200. The sleeve 300 includes plural splines serving as a dog clutch and provided so as to be spaced away in the circumferential direction along the outer peripheral surface of the counter shaft 20. In FIGS. 3 and 4, one of the splines in the plural splines of the sleeve 300 is illustrated. The sleeve 300 engages with the hub 200 in a state where the plural splines of the sleeve 300 are meshed with the plural splines of the hub 200. The sleeve 300 may be also made of metal such as iron, steel, aluminum alloy and titanium alloy, for example.

Each of the splines of the sleeve 300 slides in the axial direction between the first position P1 at which the spline is positioned (i.e., spline-connected) between the two adjacent raised portions 148 provided at the support portion 140 of the disc spring unit 100 so that the disc spring unit 100 is integrally rotatable with the counter shaft 20 and the second position P2 at which the spline disengages and separates from the aforementioned two adjacent raised portions 148 so that the disc spring unit 100 is rotatable relative to the counter shaft 20.

The aforementioned sliding of the sleeve 300 (specifically, each of the splines thereof) between the first position P1 and the second position P2 is achievable by the solenoid 400 serving as an example of an actuator.

In a state where each of the splines of the sleeve 300 is arranged at the first position P1 as illustrated with a solid line in FIGS. 3 and 4, the rotation of the counter driven gear 50 causes the raised portions 148 provided at the support portion 140 of the disc spring unit 100 to make contact with the corresponding splines of the sleeve 300 so that the raised portions 148 press the corresponding splines of the sleeve 300 in the circumferential direction. Accordingly, the disc spring unit 100 (the counter driven gear 50) is integrally rotatable with the counter shaft 20.

On the other hand, in a state where each of the splines of the sleeve 300 is arranged at the second position P2 as illustrated with a dotted line in FIGS. 3 and 4, the raised portions 148 provided at the support portion 140 of the disc spring unit 100 are inhibited from making contact with the corresponding splines of the sleeve 300. Accordingly, the disc spring unit 100 (the counter driven gear 50) is rotatable relative to the counter shaft 20.

Next, the operation of the torque limiter 90 including the aforementioned construction in a case where the torque limiter 90 exercises the torque connection/disconnection function is explained with reference to FIGS. 8A, 8B, 8C, 8D, 8E and 8F.

Figure 8A:
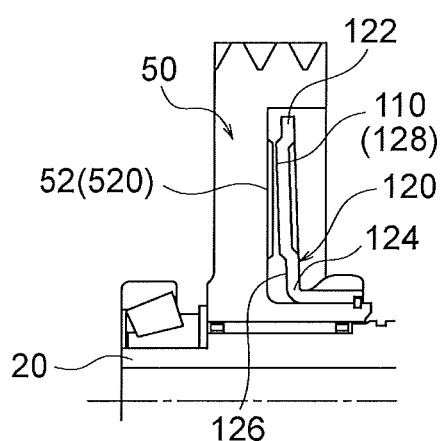
FIGS. 8A, 8B, 8C, 8D, 8E and 8F are schematic views each of which explains an operation of the torque limiter illustrated in FIG. 3.
Figure 8B:
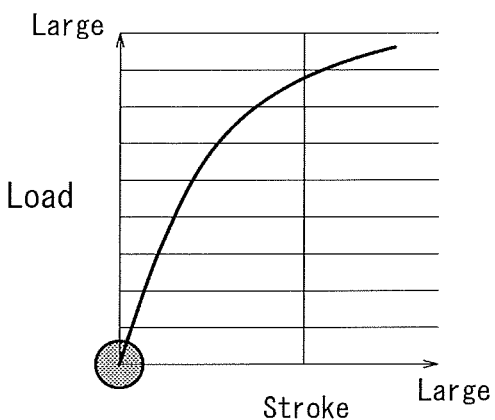
Figure 8C:
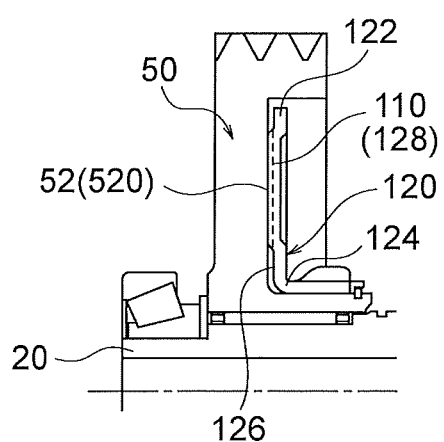
Figure 8D:
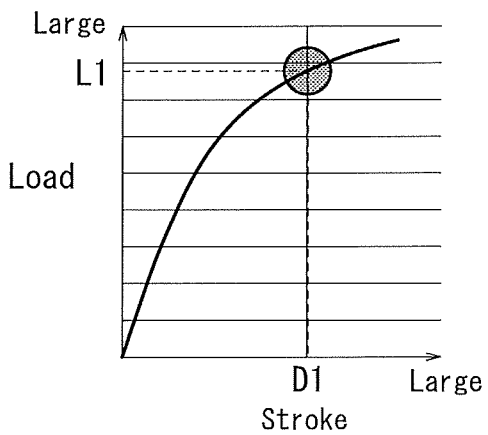
Figure 8E:
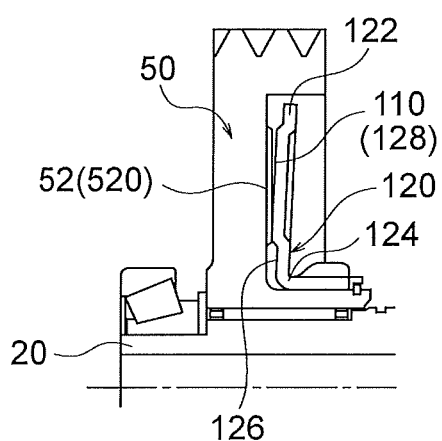
Figure 8F:
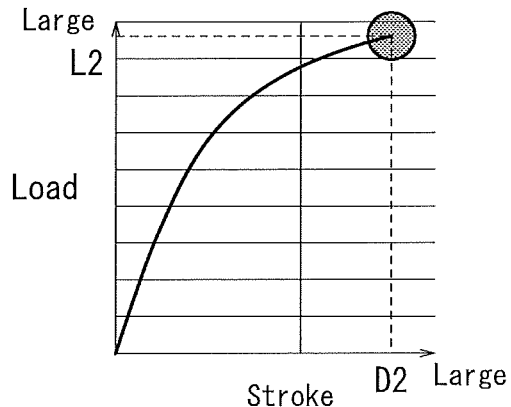

A positional relationship between the first face cam 52 and the second face cam 110 before completion of mounting of the disc spring unit 100 to the counter driven gear 50 (i.e., in a free state of the torque limiter 90 during assembly operation of the disc spring portion 120 on the counter driven gear 50) is illustrated in FIG. 8A. A positional relationship between the first face cam 52 and the second face cam 110 in a state where the disc spring unit 100 is mounted to the counter driven gear 50 (i.e., in a normal state of the torque limiter 90) is illustrated in FIG. 8C. A positional relationship between the first face cam 52 and the second face cam 110 in a state where the release torque is input to the second face cam 110 (or the first face cam 52) is illustrated in FIG. 8E. Each graph in FIGS. 8B, 8D, and 8F shows a relationship between a load applied to the disc spring portion 120 and a stroke (an amount of displacement) of the disc spring portion 120 corresponding to each of the positional relationships between the first face cam 52 and the second face cam 110 illustrated in FIGS. 8A, 8C and 8E.

In the free state of the torque limiter 90 where the external force is not applied to the disc spring portion 120 of the disc spring unit 100 as illustrated in FIG. 8A, the surface 126 of the disc spring portion 120 is inclined so that the first end 122 is positioned closer to the first face cam 52 than the second end 124. In the aforementioned state, because no load is applied to the disc spring portion 120, the stroke of the disc spring portion 120 is zero as illustrated in FIG. 8B.

In the state where the disc spring unit 100 is mounted to the counter driven gear 50 as illustrated in FIG. 8C, the load is applied to the disc spring portion 120 in a direction opposite to the first face cam 52. Thus, the surface 126 of the disc spring portion 120 extends substantially in parallel to a vertical direction. In such state, a load L1 is applied to the disc spring portion 120 opposite to the first face cam 52 along the axial direction, so that a stroke D1 of the disc spring portion 120 is obtained.

As illustrated in FIG. 8E, the release torque is input to the second face cam 110 (or the first face cam 52). In a case where torque in the circumferential direction is applied to the second face cam 110 or the first face cam 52, each of the teeth 128 receives a force (a load) opposite to the first face cam 52 along the axial direction because each of the teeth 128 of the second face cam 110 and each of the teeth 520 of the first face cam 52 make contact with each other via the inclined surfaces (i.e., the first inclination surface 608 and the second inclination surface 610 of each of the teeth 128 and the first and second inclination surfaces of each of the teeth 520). When the torque input to the second face cam 110 or the first face cam 52 reaches the release torque, the load L1 is applied to the disc spring portion 120 opposite to the first face cam 52 along the axial direction as illustrated in FIG. 8F, so that a stroke D2 of the disc spring portion 120 is obtained. Accordingly, the surface 126 of the disc spring portion 120 is inclined so that the first end 122 is positioned further away than the second end 124 from the first face cam 52. The first face cam 52 and the second face cam 110 disengage from each other to interrupt the torque transmission between the first face cam 52 and the second face cam 110.

As illustrated in FIGS. 8B, 8D and 8F, the amount of stroke which increases with increase of load by a certain amount (fixed amount) is relatively small in a range where the load applied to the disc spring portion 120 is zero to L1. On the other hand, in a range where the load applied to the disc spring portion 120 is L1 to L2, the amount of stroke which increases with increase of load by the certain amount (fixed amount) is relatively large. With the disc spring portion 120 including the aforementioned characteristics, the second face cam 110 keeps engagement with the first face cam 52 until input torque reaches the release torque and the engagement between the second face cam 110 and the first face cam 52 may be immediately released at the time the torque equal to or greater than the release torque is input.

The disc spring unit 100 performing the aforementioned torque connection/disconnection function is configured to be deflected or bend so that the second face cam 110 is displaced in the direction opposite to the first face cam 52. Thus, the disc spring unit 100 operates to release the engagement between the second face cam 110 and the first face cam 52. The disc spring portion 120 of the disc spring unit 100 is integrally formed and provided with the support portion 140 which is restricted from sliding in the direction opposite to the first face cam 52 along the axial direction. Thus, in the entire disc spring unit 100, a portion which slides relative to the other components (i.e., a sliding portion), specifically, the counter driven gear 50, merely exists. The release torque is therefore restrained from variating or fluctuating because of magnitude of friction force which may result from the sliding portion in the disc spring unit 100.

Because the disc spring unit 100 does not substantially include any portion which slides relative to the other component as mentioned above, the disc spring unit 100 also does not substantially include a sliding member with a large inertia mass. Thus, even when a high-frequency impact load is input to the disc spring unit 100, the disc spring unit 100 may securely release the engagement between the second face cam 110 and the first face cam 52. The release torque is restrained from variating or fluctuating because of magnitude of friction force which may result from the sliding portion in the disc spring unit 100.

The second face cam 110 and the disc spring portion 120 are integrally formed, i.e., the second face cam 110 is formed at the disc spring portion 120 itself, thereby decreasing the number of components. In addition, the support portion 140 supporting the disc spring portion 120 is also integrally formed in addition to the second face cam 110 and the disc spring portion 120, thereby further decreasing the number of components. Cost reduction may be achieved for obtaining the torque limiter.

In a case where the disc spring portion 120 operates to release the torque transmission (i.e., performs a torque release operation), a radially outer region and a radially inner region of the second face cam 110 release the engagement, in the mentioned order, relative to the first face cam 52 in the process of deflection of the disc spring portion 120 to which the torque is input so that the second face cam 110 is displaced in the direction opposite to the first face cam 52. The aforementioned state is clearly understood in comparison between the disc spring portion 120 in FIG. 8C and the disc spring portion 120 in FIG. 8E. With the torque release operation by the disc spring portion 120, the torque transmission between the first face cam 52 and the second face cam 110 moves to the inner diameter side to decrease transmissive torque. Accordingly, torque increase from the start to the end of the torque release operation may be reduced. While the torque transmission required before the start of the torque release operation is secured, the release torque may be reduced.

As mentioned above, the radially outer region and the radially inner region of the second face cam 110 release the engagement, in the mentioned order, relative to the first face cam 52 in the process of deflection of the disc spring portion 120 to which the torque is input so that the second face cam 110 is displaced in the direction opposite to the first face cam 52. Thus, at a moment immediately before the second face cam 110 completely releases the engagement with the first face cam 52, only the inner diameter region of the second face cam 110 engages with the first face cam 52. In this case, the inner diameter region of the second face cam 110 may possibly locally receive a large torque.

Figure 9:
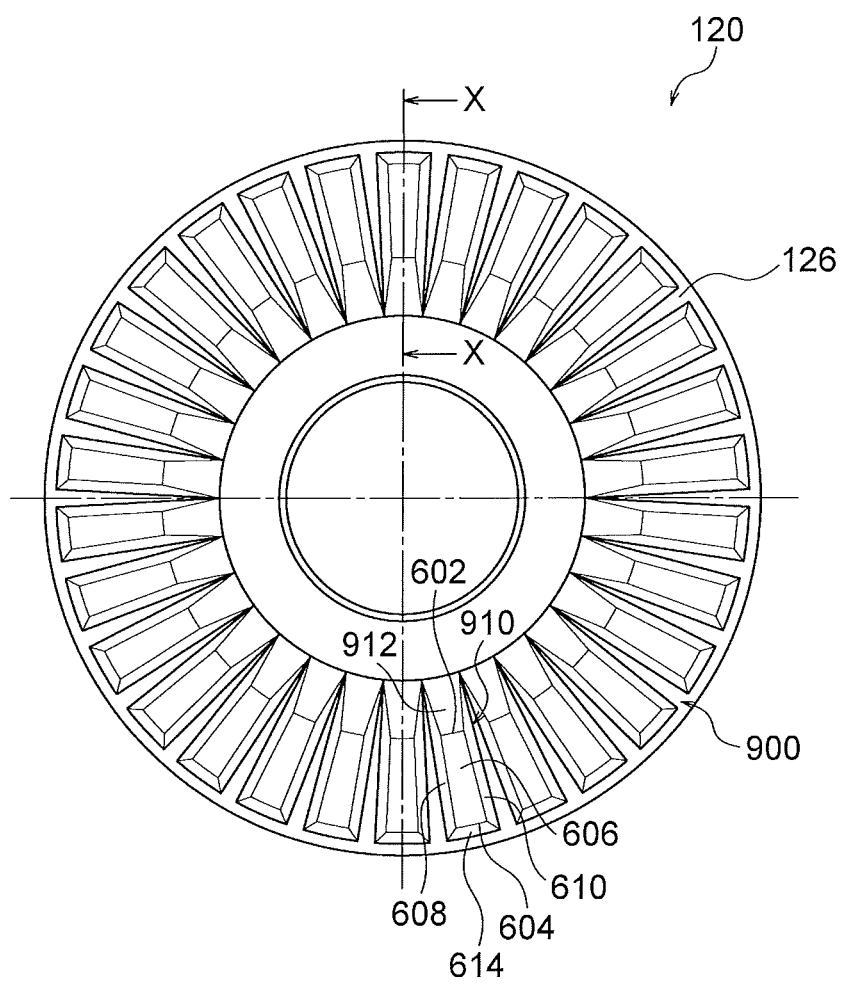
FIG. 9 is side view schematically illustrating the construction of the disc spring portion of the disc spring unit included in the torque limiter according to another embodiment disclosed here.
Figure 10:
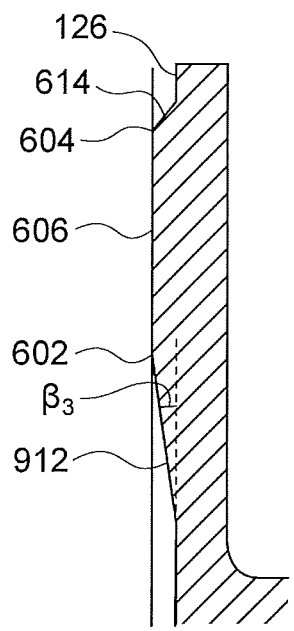
FIG. 10 is a cross-sectional view schematically illustrating a construction of each tooth formed at the disc spring portion illustrated in FIG. 9 as viewed from X-X plane.

In order to eliminate the aforementioned possibility, the disc spring portion 120 may include a second face cam 900 as illustrated in FIGS. 9 and 10 according to another embodiment.

A difference of the second face cam 900 serving as the second meshing portion from the second face cam 110 illustrated in FIGS. 5 and 6 is explained below.

As illustrated in FIGS. 9 and 10, the second face cam 900 includes plural teeth 910 (second protruding portions) provided so as to be spaced away from one another and extending radially. Each of the teeth 910 includes the main surface 606, the first inclination surface 608, the second inclination surface 610, a third inclination surface 912 and the fourth inclination surface 614. The main surface 606 extends in the radial direction from the first end 602 to the second end 604 in parallel to the surface 126 towards the outer circumferential edge of the surface 126. The first inclination surface 608 extends in the radial direction by connecting between the main surface 606 and the surface 126. The second inclination surface 610 extends in the radial direction by connecting between the main surface 606 and the surface 126 while sandwiching the main surface 606 with the first inclination surface 608. The third inclination surface 912 extends in the radial direction towards the center axis of the disc spring portion 120 from the first end 602 of the main surface 606 and inclines towards the surface 126. The fourth inclination surface 614 extends in the radial direction towards the outer peripheral edge of the disc spring portion 120 from the second end 604 of the main surface 606 and inclines towards the surface 126.

An angle β3 formed by the third inclination surface 912 relative to the surface 126 is specified smaller than the angle α1 formed by the first inclination surface 608 relative to the surface 126, the angle α2 formed by the second inclination surface 610 relative to the surface 126 and the angle α4 formed by the fourth inclination surface 614 relative to the surface 126. Thus, each of the teeth 910 includes a thickness which is constant from the second end 604 to a center portion and which decreases from the center portion towards the center axis of the disc spring portion 120. At a moment immediately before the second face cam 900 completely releases the engagement with the first face cam 52, a situation where only the inner diameter region of the second face cam 900 engages with the first face cam 52 may be inhibited from occurring. A large torque is restrained from being locally applied to an inner diameter region of the second face cam 900.

In the aforementioned embodiments, the torque limiter includes both the torque connection/disconnection function and the drive force connection/disconnection function. Because the torque limiter does not necessary include the drive force connection/disconnection function, the drive force connection/disconnection function may be omitted.

A difference of the torque limiter according to still another embodiment illustrated in FIG. 11 from the torque limiter illustrated in FIG. 3 is explained below.

Figure 11:
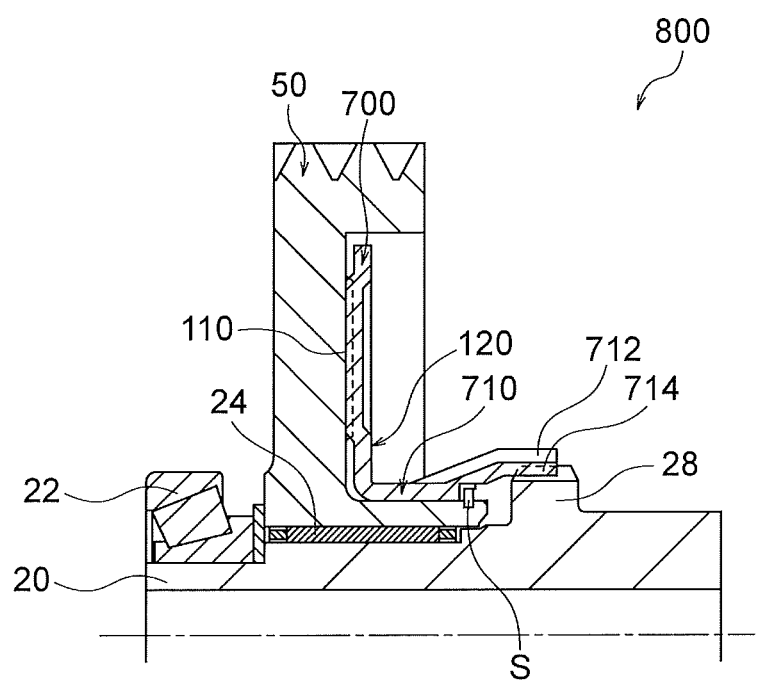
FIG. 11 is a cross-sectional view schematically illustrating partially enlarged constructions of the torque limiter according to still another embodiment and of related components to the torque limiter.

A disc spring unit 700 included in a torque limiter 800 illustrated in FIG. 11 is spline-connected to plural projecting portions 28 provided at the counter shaft 20 in a manner being spaced away from one another along the outer circumference of the counter shaft 20 so that the counter driven gear 50 and the counter shaft 20 are connected to be integrally rotatable with each other. Specifically, the disc spring unit 700 includes the disc spring portion 120 which may include the same construction as the disc spring portion 120 illustrated in FIGS. 3, 5 and 6, and a support portion 710 integrally connected to the disc spring portion 120. The support portion 710 includes a tubular form in the same manner as the aforementioned support portion 140 and includes plural recess portions 714 at an end portion, the recess portions 714 being arranged to be spaced away from one another in the circumferential direction of the support portion 710. Each of the recess portions 714 engages with the corresponding projecting portion 28 in the plural projecting portions 28 provided at the counter shaft 20. Accordingly, when the counter driven gear 50 rotates, the projecting portions 28 provided at the counter shaft 20 make contact with the respective recess portions 714 provided at the support portion 710 of the disc spring unit 700 to press the respective recess portions 714. As a result, the disc spring unit 700 (the counter driven gear 50) is integrally rotatable with the counter shaft 20.

As illustrated in FIG. 11, the support portion 710 of the disc spring unit 700 is restricted from moving in a direction away from the first face cam 52 along the axial direction (i.e., in a right direction in FIG. 11) by the snap ring S, in the same way as the support portion 140 illustrated in FIG. 3. Thus, also in the torque limiter 800 illustrated in FIG. 11, the disc spring portion 120 of the disc spring unit 700 is integrally formed and provided with the support portion 710 which is restricted from moving in the direction opposite to (i.e., away from) the first face cam 52 along the axial direction. Thus, in the entire disc spring unit 700, a portion which slides relative to the other components (i.e., a sliding portion), specifically, the counter driven gear 50, merely exists. In a case where the release torque as intended at a time of designing the torque limiter 800 is actually input to the disc spring unit 700, the disc spring unit 700 may securely release the engagement between the second face cam 110 and the first face cam 52.

As mentioned above, the support portion 710 of the disc spring unit 700 is restricted from moving in the direction away from the first face cam 52 along the axial direction by the snap ring S. Thus, each of the projecting portions 28 provided at the counter shaft 20 and each of the recess portions 714 provided at the support portion 710 hardly slide to each other in the axial direction.

In the torque limiter according to the aforementioned embodiments performing the torque connection/disconnection function (and the drive force connection/disconnection function) between the input shaft and the output shaft, the counter driven gear 50 is employed as the input shaft and the counter shaft 20 is employed as the output shaft. At this time, technical thought in this disclosure is also applicable in a case where the torque connection/disconnection function (and the drive force connection/disconnection function) is obtained between any input shaft and any output shaft transmitting a drive force of an engine or a motor.

According to the aforementioned embodiments, the torque limiter 90, 800 includes the first meshing portion (first face cam) 52 provided at the surface 510 of the input shaft (counter driven gear) 50 which transmits the drive force of the motor, the surface 510 intersecting with an axial direction of the input shaft 50, and the disc spring portion 120 including the second meshing portion (second face cam) 110, 900 which is arranged facing the first meshing portion 52 in the axial direction and which is configured to mesh with the first meshing portion 52, the disc spring portion 120 being integrally rotatable with the output shaft (counter shaft) 20 which is provided coaxially with the input shaft 50 and which is rotatable relative to the input shaft 50, the disc spring portion 120 being deflected to displace the second meshing portion 110, 900 in a direction opposite to the first meshing portion 52 in a case where a load equal to or greater than a set value is applied to the disc spring portion 120 while the second meshing portion 110, 900 is being biased towards the first meshing portion 52.

Accordingly, in a case where the load equal to or greater than the set value (i.e., a predetermined torque) is input to the disc spring portion 120, the disc spring portion 120 is deflected to displace the second meshing portion (second face cam) 110, 900 provided at the disc spring portion 120 in the direction opposite to the first meshing portion (first face cam) 52 provided at the input shaft (counter driven gear) 50. As a result, meshing between the first meshing portion 52 and the second meshing portion 110, 900 is released to interrupt torque transmission between the input shaft 50 and the output shaft (counter shaft) 20. The torque limiter 90, 800 which realizes the torque connection/disconnection function may be thus obtained.

The torque limiter 90, 800 further includes the support portion 140, 710 integrally provided with the disc spring portion 120 and including a tubular form, the support portion 140, 710 including the plural raised portions 148 at an outer peripheral surface, the plural raised portions 148 extending in the axial direction and being spaced away from one another in a circumferential direction. The output shaft (counter shaft) 20 includes the sliding member (sleeve) 300 sliding in the axial direction between the first position P1 at which the sliding member 300 is positioned within the plural raised portions 148 so that the disc spring portion 120 is integrally rotatable with the output shaft 20 and the second position P2 at which the sliding member 300 is away from the plural raised portions 148 so that the disc spring portion 120 is rotatable relative to the output shaft 20.

Accordingly, the support portion 140, 710 which is integrally provided with the disc spring portion 120 allows transmission of the drive force between the input shaft (counter driven gear) 50 and the output shaft (counter shaft) 20 by engaging with the sliding member (sleeve) 300 provided at the output shaft 20 to be slidable in the axial direction and prohibits the transmission of the drive force between the input shaft 50 and the output shaft 20 by releasing the engagement with the sliding member 300. The torque limiter 90, 800 which realizes the drive force connection/disconnection function may be thus obtained.

The support portion 140, 710 is restricted from moving in the axial direction by being fixed to the input shaft (counter driven gear) 50.

Because the disc spring portion 120 and the support portion 140, 710 are integrally provided with each other and the support portion 140, 710 is fixed to the input shaft (counter driven gear) 50 in a state where the support portion 140, 710 is restricted from moving in the axial direction, the disc spring portion 120 and the support portion 140, 710 are substantially inhibited from generating a friction force which may result from a sliding with other components such as the input shaft 50, for example. Accordingly, the torque limiter 90, 800 which restrains fluctuation or variation of release torque may be obtained.

The first meshing portion (first face cam) 52 includes the plural first protruding portions (teeth) 520 arranged to be spaced away from one another and radially extending. The second meshing portion (second face cam) 110, 900 includes the plural second protruding portions (teeth) 128, 910 arranged to be spaced away from one another and radially extending.

Accordingly, the first meshing portion (first face cam) 52 including the plural first protruding portions (teeth) 520 may be securely meshed with the second meshing portion (second face cam) 110, 900 including the plural second protruding portions (teeth) 128, 910. The torque limiter 90, 800 which realizes the torque connection/disconnection function may be thus obtained.

The plural second protruding portions (teeth) 128, 910 is provided at the reference surface (surface) 126 in an annular region of the disc spring portion 120, each of the plural second protruding portions 128, 910 including the main surface 606 which extends in a radial direction from the first end 602 to the second end 604 in parallel to the reference surface 126 towards an outer circumferential edge of the annular region, the first inclination surface 608 which extends in the radial direction by connecting between the main surface 606 and the reference surface 126, and the second inclination surface 610 which extends in the radial direction by connecting between the main surface 606 and the reference surface 126 while sandwiching the main surface 606 with the first inclination surface 608.

Because the plural second protruding portions (teeth) 128, 910 constituting the second meshing portion (second face cam) 110, 900 are meshed with the plural first protruding portions (teeth) 520 constituting the first meshing portion (first face cam) 52 via the first inclination surface 608 and the second inclination surface 610, the second meshing portion 110, 900 (or the first meshing portion 52) is pressed in the direction opposite to the first meshing portion 52 (or the second meshing portion 110, 900) in a case where the load equal to or greater than the set value (i.e., the predetermined torque) is input to the disc spring portion 120. Accordingly, the torque limiter 90, 800 which realizes the torque connection/disconnection function may be thus obtained.

Each of the plural second protruding portions (teeth) 910 includes the third inclination surface 912 which extends in the radial direction towards a center axis of the disc spring portion 120 from the first end 602 of the main surface 606 and inclines towards the reference surface 126. The third inclination surface 912 forms the angle β3 relative to the reference surface 126, the angle β3 being smaller than the angle α1, α2 formed by each of the first inclination surface 608 and the second inclination surface 610 relative to the reference surface 126.

Because each of the plural second protruding portions 910 constituting the second meshing portion (second face cam) 900 includes the third inclination surface 912 which extends in the radial direction towards the center axis of the disc spring portion 120, a situation where torque is locally applied to an inner region of each of the plural second protruding portions 910 of the second meshing portion 900 is restrained.

The disc spring portion 120 includes the radius which decreases from the first end 122 to the second end 124 in a state where an external force is inhibited from being applied to the disc spring portion 120, the disc spring portion 120 including the penetration bore 125 at the second end 124.

Accordingly, in a case where the load equal to or greater than the set value (i.e., a predetermined torque) is input to the disc spring portion 120, the disc spring portion 120 is deflected to displace the second meshing portion (second face cam) 110, 900 provided at the disc spring portion 120 in the direction opposite to the first meshing portion (first face cam) 52 provided at the input shaft (counter driven gear) 50. As a result, meshing between the first meshing portion 52 and the second meshing portion 110, 900 is released to interrupt torque transmission between the input shaft 50 and the output shaft (counter shaft) 20. The torque limiter 90, 800 which realizes the torque connection/disconnection function may be thus obtained.

The second meshing portion (second face cam) 110, 900 including the plural second protruding portions (teeth) 128, 910 is provided at the surface 126 of the disc spring portion 120, the surface 126 facing the first meshing portion (first face cam) 52 including the plural first protruding portions (teeth) 520. One of the plural second protruding portions 128, 910 and the other one of the plural second protruding portions 128, 910 adjacent to each other in the plural second protruding portions 128, 910 define an interval therebetween, the interval at which one of the plural first protruding portions 520 is configured to be arranged.

Accordingly, the first meshing portion (first face cam) 52 including the plural first protruding portions (teeth) 520 may be securely meshed with the second meshing portion (second face cam) 110, 900 including the plural second protruding portions (teeth) 128, 910. The torque limiter 90, 800 which realizes the torque connection/disconnection function may be thus obtained.

The support portion 140, 710 includes the radius which increases from the first end 142 to the intermediate portion 144 of the support portion 140, 710, the radius being constant from the intermediate portion 144 to the second end 146 of the support portion 140, 710.

Accordingly, the support portion 140, 710 which is integrally provided with the disc spring portion 120 allows transmission of the drive force between the input shaft (counter driven gear) 50 and the output shaft (counter shaft) 20 by engaging with the sliding member (sleeve) 300 provided at the output shaft 20 to be slidable in the axial direction and prohibits the transmission of the drive force between the input shaft 50 and the output shaft 20 by releasing the engagement with the sliding member 300. The torque limiter 90, 800 which realizes the drive force connection/disconnection function may be thus obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque limiter comprising:
   a first meshing portion provided at a surface of an input shaft which transmits a drive force of a drive motor, the surface intersecting with an axial direction of the input shaft;
   a disc spring portion including a second meshing portion which is arranged facing the first meshing portion in the axial direction and which is configured to mesh with the first meshing portion, the disc spring portion being integrally rotatable with an output shaft which is provided coaxially with the input shaft and which is rotatable relative to the input shaft, the disc spring portion being deflected to displace the second meshing portion in a direction opposite to the first meshing portion in a case where a load equal to or greater than a set value is applied to the disc spring portion while the second meshing portion is being biased towards the first meshing portion; and
   a support portion integrally provided with the disc spring portion and including a tubular form, the support portion including a plurality of raised portions at an outer peripheral surface, the plurality of raised portions extending in the axial direction and being spaced away from one another in a circumferential direction, wherein
   the output shaft includes a sliding member sliding in the axial direction between a first position at which the sliding member is positioned within the plurality of raised portions so that the disc spring portion is integrally rotatable with the output shaft and a second position at which the sliding member is away from the plurality of raised portions so that the disc spring portion is rotatable relative to the output shaft.

2. The torque limiter according to claim 1, wherein the support portion is restricted from moving in the axial direction by being fixed to the input shaft.

3. The torque limiter according to claim 1, wherein
   the first meshing portion includes a plurality of first protruding portions arranged to be spaced away from one another and radially extending,
   the second meshing portion includes a plurality of second protruding portions arranged to be spaced away from one another and radially extending.

4. The torque limiter according to claim 3, wherein the plurality of second protruding portions is provided at a reference surface in an annular region of the disc spring portion, each of the plurality of second protruding portions including a main surface which extends in a radial direction from a first end to a second end in parallel to the reference surface towards an outer circumferential edge of the annular region, a first inclination surface which extends in the radial direction by connecting between the main surface and the reference surface, and a second inclination surface which extends in the radial direction by connecting between the main surface and the reference surface while sandwiching the main surface with the first inclination surface.

5. The torque limiter according to claim 4, wherein
   each of the plurality of second protruding portions includes a third inclination surface which extends in the radial direction towards a center axis of the disc spring portion from the first end of the main surface and inclines towards the reference surface,
   the third inclination surface forms an angle relative to the reference surface, the angle being smaller than an angle formed by each of the first inclination surface and the second inclination surface relative to the reference surface.

6. The torque limiter according to claim 1, wherein the disc spring portion includes a radius which decreases from a first end to a second end in a state where an external force is inhibited from being applied to the disc spring portion, the disc spring portion including a penetration bore at the second end.

7. The torque limiter according to claim 3, wherein
   the second meshing portion including the plurality of second protruding portions is provided at a surface of the disc spring portion, the surface facing the first meshing portion including the plurality of first protruding portions,
   one of the plurality of second protruding portions and the other one of the plurality of second protruding portions adjacent to each other in the plurality of second protruding portions define an interval therebetween, the interval at which one of the plurality of first protruding portions is configured to be arranged.

8. The torque limiter according to claim 1, wherein the support portion includes a radius which increases from a first end to an intermediate portion of the support portion, the radius being constant from the intermediate portion to a second end of the support portion.

9. A torque limiter comprising:
   a first meshing portion provided at a surface of an input shaft which transmits a drive force of a drive motor, the surface intersecting with an axial direction of the input shaft; and
   a disc spring portion including a second meshing portion which is arranged facing the first meshing portion in the axial direction and which is configured to mesh with the first meshing portion, the disc spring portion being integrally rotatable with an output shaft which is provided coaxially with the input shaft and which is rotatable relative to the input shaft, the disc spring portion being deflected to displace the second meshing portion in a direction opposite to the first meshing portion in a case where a load equal to or greater than a set value is applied to the disc spring portion while the second meshing portion is being biased towards the first meshing portion, wherein
   the first meshing portion includes a plurality of first protruding portions arranged to be spaced away from one another and radially extending,
   the second meshing portion includes a plurality of second protruding portions arranged to be spaced away from one another and radially extending, and
   the plurality of second protruding portions is provided at a reference surface in an annular region of the disc spring portion, each of the plurality of second protruding portions including a main surface which extends in a radial direction from a first end to a second end in parallel to the reference surface towards an outer circumferential edge of the annular region, a first inclination surface which extends in the radial direction by connecting between the main surface and the reference surface, and a second inclination surface which extends in the radial direction by connecting between the main surface and the reference surface while sandwiching the main surface with the first inclination surface.

10. The torque limiter according to claim 9, wherein
    each of the plurality of second protruding portions includes a third inclination surface which extends in the radial direction towards a center axis of the disc spring portion from the first end of the main surface and inclines towards the reference surface, and the third inclination surface forms an angle relative to the reference surface, the angle being smaller than an angle formed by each of the first inclination surface and the second inclination surface relative to the reference surface.

11. A torque limiter comprising:

a first meshing portion provided at a surface of an input shaft which transmits a drive force of a drive motor, the surface intersecting with an axial direction of the input shaft; and a disc spring portion including a second meshing portion which is arranged facing the first meshing portion in the axial direction and which is configured to mesh with the first meshing portion, the disc spring portion being integrally rotatable with an output shaft which is provided coaxially with the input shaft and which is rotatable relative to the input shaft, the disc spring portion being deflected to displace the second meshing portion in a direction opposite to the first meshing portion in a case where a load equal to or greater than a set value is applied to the disc spring portion while the second meshing portion is being biased towards the first meshing portion, wherein the first meshing portion includes a plurality of first protruding portions arranged to be spaced away from one another and radially extending, the second meshing portion includes a plurality of second protruding portions arranged to be spaced away from one another and radially extending, the second meshing portion including the plurality of second protruding portions is provided at a surface of the disc spring portion, the surface facing the first meshing portion including the plurality of first protruding portions, and one of the plurality of second protruding portions and the other one of the plurality of second protruding portions adjacent to each other in the plurality of second protruding portions define an interval therebetween, the interval at which one of the plurality of first protruding portions is configured to be arranged.

* * * * *